US012754653B2

(12) United States Patent
Yerli

(10) Patent No.: US 12,754,653 B2
(45) **Date of Patent: *Oct. 6, 2026**

(54) LAYER-PARTITIONED VIRTUAL WORLD SYSTEM

(71) Applicant: TMRW Group IP, Luxembourg (LU)

(72) Inventor: Cevat Yerli, Dubai (AE)

(73) Assignee: TMRW GROUP IP, Luxembourg (LU)

( * ) Notice: Subject to any disclaimer, the term of this patent is extended or adjusted under 35 U.S.C. 154(b) by 108 days.

This patent is subject to a terminal disclaimer.

(21) Appl. No.: 18/800,911

(22) Filed: Aug. 12, 2024

(65) Prior Publication Data

US 2024/0402874 A1 Dec. 5, 2024

Related U.S. Application Data

(63) Continuation of application No. 17/741,227, filed on May 10, 2022, now Pat. No. 12,086,375.

(51) Int. Cl.
*G06F 3/04815* (2022.01)
*G06T 13/20* (2011.01)
(Continued)

(52) U.S. Cl.
CPC .......... *G06F 3/04815* (2013.01); *G06T 13/20* (2013.01); *G06T 19/006* (2013.01); *H04L 67/131* (2022.05)

(58) Field of Classification Search
CPC ... G06F 3/04815; G06T 13/20; G06T 19/006; G06T 13/40; G06T 15/005; G06T 19/003;
(Continued)

(56) References Cited

U.S. PATENT DOCUMENTS 8,527,625 B2 9/2013 Dolbier et al.
2008/0214253 A1 9/2008 Gillo et al.
(Continued)

FOREIGN PATENT DOCUMENTS

CA 3 034 068 A1 9/2019
EP 3754468 A1 12/2020
(Continued)

OTHER PUBLICATIONS

Higinio, M., et al., "Multilayer Architecture Model for Mobile Cloud Computing Paradigm", Wiley, Hindawi, vol. 2019, Article ID 3951495, Feb. 11, 2019, 13 pages.
(Continued)

*Primary Examiner* — Jitesh Patel
(74) *Attorney, Agent, or Firm* — BRYAN CAVE LEIGHTON PAISNER LLP

(57) ABSTRACT

In some embodiments, a layer-partitioned virtual world system includes at least one server computing device, a plurality of third-party software engines, and one or more client devices. The server computing device includes at least one processor and memory storing a base layer including a persistent virtual world system that includes a plurality of virtual objects, the base layer supporting a plurality of virtual world layers providing further functionality to the persistent virtual world system through a plurality of applications. The plurality of third-party software engines are hosted on corresponding third-party server computing devices communicatively coupled to the at least one server computing device via a network and providing services to the plurality of applications. The one or more client devices receive and display composited virtual frames corresponding to the base layer and further functionalities of one or more of the virtual world layers.

20 Claims, 15 Drawing Sheets

(51) Int. Cl.
*G06T 19/00* (2011.01)
*H04L 67/131* (2022.01)

(58) Field of Classification Search
CPC ....... G06T 19/20; H04L 67/131; H04L 67/53; A63F 13/352; A63F 13/355; A63F 13/53; A63F 13/655; A63F 13/75; A63F 13/335
See application file for complete search history.

(56) References Cited

U.S. PATENT DOCUMENTS

| | | | | |
|---|---|---|---|---|
| 2010/0030854 | A1* | 2/2010 | Dolbier | A63F 13/335 715/848 |
| 2013/0044106 | A1 | 2/2013 | Shuster et al. | |
| 2018/0089903 | A1* | 3/2018 | Pang | H04N 23/45 |
| 2018/0227211 | A1 | 8/2018 | Vijayanathan et al. | |
| 2019/0073832 | A1* | 3/2019 | Kim | G06T 19/003 |
| 2019/0361797 | A1* | 11/2019 | Yerli | G06F 3/011 |
| 2020/0404218 | A1* | 12/2020 | Yerli | G06F 9/46 |
| 2021/0132781 | A1 | 5/2021 | Daniels et al. | |
| 2021/0133928 | A1* | 5/2021 | Ding | G06T 3/40 |

FOREIGN PATENT DOCUMENTS

| | | | |
|---|---|---|---|
| EP | 3754469 | A1 | 12/2020 |
| EP | 3754946 | A1 | 12/2020 |
| EP | 3846058 | A1 | 7/2021 |

OTHER PUBLICATIONS

U.S. Appl. No. 17/741,227, filed May 10, 2022.

* cited by examiner

500

600a

700

LAYER-PARTITIONED VIRTUAL WORLD SYSTEM

CROSS-REFERENCE TO PRIOR APPLICATIONS

This application is a Continuation of U.S. patent application Ser. No. 17/741,227, filed May 10, 2022, hereby expressly incorporated by reference in its entirety.

BACKGROUND

Current technological trends include the development of digital reality, which collectively includes augmented, virtual, and mixed reality technologies. The impact of these technologies may be considered a breakthrough that will revolutionize the entertainment, learning, financial, medical, mechanical, and other industries. Digital reality applications are developed via software engines (e.g., game or 3D engines), which offer an environment created specially to implement the functionalities that are specific for these applications. These applications can be used in virtual worlds, which are computer-based simulated environments intended for users to traverse and experience through. The applications can thus provide further functionalities in the virtual worlds.

Nowadays, development, organization and filtering of the digital reality applications in a virtual world faces some drawbacks. For example, developers may be constrained to developing the digital reality applications on the same game engine that was used to build the virtual world. Furthermore, in some occasions, it may be necessary to provide further functionality to the virtual world, such as highlighting or hiding certain objects or users, providing games within the virtual world, or filtering out objects unrelated to the current interests of the users, which may not be possible with current system arrangements.

Therefore, there is a need for flexible systems that may enable incorporation of further functionalities within virtual worlds while providing the ability to develop applications through a plurality of game or 3D engines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks described in the background may be addressed through partitioning a virtual world system in several virtual world layers as disclosed through systems and methods in the current disclosure.

In one aspect of the disclosure, a layer-partitioned virtual world system includes at least one server computing device, a plurality of third-party software engines, and one or more client devices. The server computing device includes at least one processor and memory storing a base layer including a persistent virtual world system that includes a plurality of virtual objects, the base layer supporting a plurality of virtual world layers providing further functionality to the persistent virtual world system through a plurality of applications. The plurality of third-party software engines are hosted on corresponding third-party server computing devices communicatively coupled to the at least one server computing device via a network and providing services to the plurality of applications. The one or more client devices receive and display composited virtual frames corresponding to the base layer and further functionalities of one or more of the virtual world layers.

In some embodiments, the plurality of virtual objects include at least one of virtual objects that are virtual replicas of real world objects, and virtual objects that do not represent real world objects. In some embodiments, the plurality of virtual objects includes at least one virtual object that is a virtual replica of a real world object that is capturing real-world data that is transmitted to the virtual replica, enriching and synchronizing the virtual replica with the corresponding real world object.

In some embodiments, the virtual world layers include virtual world layer configuration data that includes context parameters, application metadata and virtual world layer activation permission rules. In some embodiments, at least one virtual world layer of the virtual world layers includes sub-layers, each sub-layer includes corresponding sub-layer configuration data. In some embodiments, the one or more services provided by the one or more third-party software engines comprise at least simulation services and rendering services used in creation and run-time execution of the applications. In some embodiments, the context parameters comprise one or more of a location; a weather condition; a date; a time of day; a user entitlement; and an application theme. In some embodiments, the virtual world layer activation permission rules comprise permanent activation; context-based activation; manual activation upon matching one or more context parameters; manual activation at any moment; or security level clearance activation.

In some embodiments, the virtual world layer configuration data is stored on the at least one server computing device, and the at least one server computing device is configured to receive, from a client device, a virtual world layer activation permission rule, receive a user state from the one or more client devices, compare the user state with virtual world layer activation permission rules to check whether the virtual world layer activation permission rule is met, and, in response to determining that the virtual world layer activation permission rule is met, retrieve application services associated with further functionality provided by corresponding one or more software engines hosted on corresponding third-party server computing devices, and provide the further functionalities to the one or more client devices.

In some embodiments, the virtual world layer configuration data is stored on the one or more third-party server computing devices, and the one or more third-party server computing devices are configured to receive, from a client device, a virtual world layer activation permission rule, receive a user state from the one or more client devices, compare the user state with virtual world layer activation permission rules to check whether a virtual world layer activation permission rule is met, and, in response to determining that a virtual world layer activation permission rule is met, retrieve application services associated with a further functionality provided by corresponding one or more third-party software engines hosted on corresponding third-party server computing devices, and provide the further functionality to the one or more client devices through the one or more third-party server computing devices.

In some embodiments, the plurality of third-party software engines are configured to provide simulation services to the applications in the corresponding virtual world layers to generate simulated application content, transmit the simulated application content to the at least one server computing device. In some embodiments, the at least one server computing device is configured to receive the simulated application content from the virtual world layers sent by the third party software engines, implement final rendering on the simulated application content from the virtual world layers to generate virtual world layer virtual frames, composite the virtual world layer virtual frames and base layer virtual frames into unitary virtual frames, and transmit the composited unitary virtual frames to the one or more client devices.

In some embodiments, the plurality of third party software engines are configured to provide simulation and rendering services to the applications in the corresponding virtual world layers, and transmit simulated and rendered application content to the at least one server computing device in virtual world layer virtual frames corresponding to each virtual world layer. In some embodiments, the at least one server computing device is configured to receive the simulated application content and rendered frames from the virtual world layers sent by the plurality of third party software engines, render the base layer to create base layer virtual frames, composite the virtual world layer virtual frames and base layer virtual frames into unitary virtual frames, and transmit the composited unitary virtual frames to the one or more client devices.

In some embodiments, the plurality of third party software engines are configured to provide simulation services to the applications in the corresponding virtual world layers to generate simulated application content, and transmit the simulated application content to the at least one server computing device. In some embodiments, the at least one server computing device is configured to receive the simulated application content from the virtual world layers sent by the third-party software engines, pre-render the simulated application content from the virtual world layers and the base layer to create pre-rendered virtual world layer virtual frames and base layer virtual frames, composite the pre-rendered virtual world layer virtual frames and base layer virtual frames into pre-rendered unitary virtual frames, and transmit the composited pre-rendered unitary virtual frames to the one or more client devices for implementing final rendering.

In one aspect, a method for providing a layer-partitioned virtual world system is provided. The method includes providing, by at least one server computing device, a base layer includes a persistent virtual world system including a plurality of virtual objects, receiving, by the at least one server computing device, further functionality for the base layer from a plurality of applications in a corresponding plurality of virtual world layers, where the plurality of applications receive services from a plurality of third-party software engines hosted by at least one third-party server computing device, and transmitting, by the at least one server computing device, virtual frames corresponding to the base layer and the further functionality.

In some embodiments, the virtual world layers comprise virtual world layer configuration data including context parameters, application metadata and virtual world layer activation permission rules. In some embodiments, the services provided by the plurality of third-party software engines comprise at least simulation and rendering services used in creation and run-time execution of the applications.

In some embodiments, the method may also include overlapping two-or-three dimensional graphical representations from the virtual world layers on top of the base layer. In some embodiments, the method may also include defining the virtual world layers graphically by transparent cutouts separating one virtual world layer from another virtual world layer; upon activating a layer, highlighting the layer graphically, and highlighting all virtual objects comprised within the virtual world layer. In some embodiments, the method may also include obtaining data points related to a field of view of a user or user avatar in the persistent virtual world system, and generating a composite based on the data points.

In some embodiments, the method may also include storing, by the at least one server computing device, the virtual world layer configuration data; receiving, by the at least one server computing device from a client device, a virtual world layer activation permission rule; receiving, by the at least one server computing device, a user state from the client device; comparing, by the at least one server computing device, the user state with virtual world layer activation permission rules to check whether any virtual world layer activation permission rule is met; and in response to determining that the virtual world layer activation permission rule is met, retrieving, by the at least one server computing device based on the application metadata, application services associated to a further functionality provided by the corresponding one or more third-party software engines hosted on corresponding third-party server computing devices. The method may also include providing the further functionality to the one or more client devices.

In some embodiments, the method may also include receiving, by the at least one server computing device, simulated application content from the virtual world layers sent by the third-party software engines, implementing, by the at least one server computing device, final rendering on the simulated application content from the virtual world layers to generate virtual world layer virtual frames, combining, by the at least one server computing device, the virtual world layer virtual frames and base layer virtual frames into unitary composited virtual frames, and transmitting, by the at least one server computing device, the unitary composited virtual frames to the one or more client devices.

In some embodiments, the method may also include receiving, by the at least one server computing device, simulated application content and virtual world layer virtual frames from the virtual world layers sent by the plurality of third-party software engines, rendering, by the at least one server computing device, the base layer to create base layer virtual frames, combining, by the at least one server computing device, the base layer virtual frames and the virtual world layer virtual frames into unitary composited virtual frames, and transmitting, by the at least one server computing device, the unitary composited virtual frames to the one or more client devices.

In some embodiments, the method may also include receiving, by the at least one server computing device, the simulated application content from the virtual world layers sent by the third-party software engines, pre-rendering, by the at least one server computing device, the simulated application content from the virtual world layers and the base layer to create pre-rendered virtual world layer virtual frames and base layer virtual frames, combining, by the at least one server computing device, the pre-rendered virtual world layer virtual frames and base layer virtual frames into pre-rendered unitary virtual frames, and transmitting, by the at least one server computing device, the pre-rendered unitary virtual frames to the one or more client devices for implementing final rendering.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
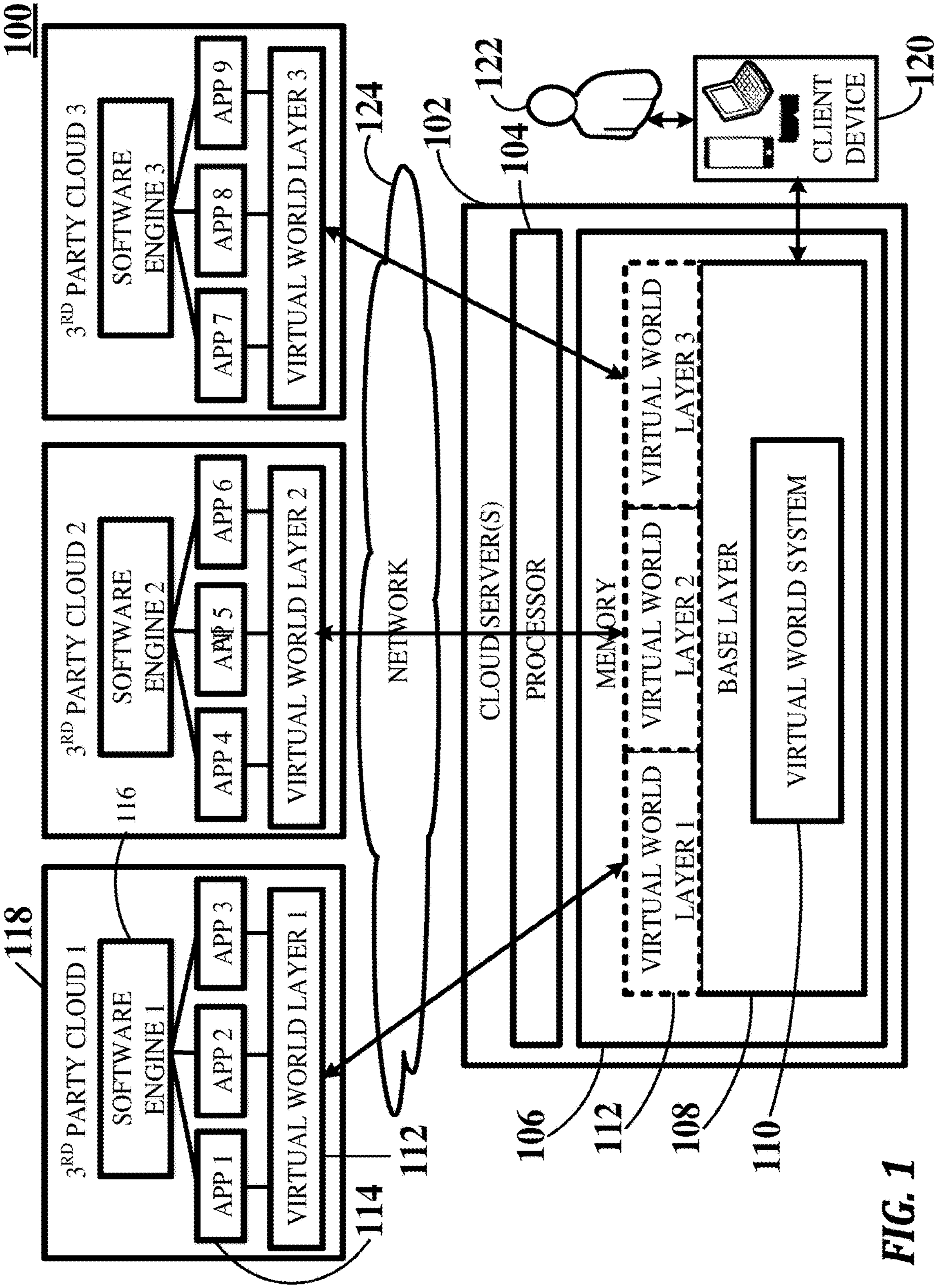
FIG. 1 depicts a schematic diagram of a layer-partitioned virtual world system, according to an embodiment.

FIG. 1 depicts a schematic diagram of a layer-partitioned virtual world system 100, according to an embodiment.

A layer-partitioned virtual world system 100 comprises at least one cloud server computer 102 comprising at least one processor 104 and memory 106 storing a base layer 108 including a persistent virtual world system 110 with a plurality of virtual objects. The base layer 108 may support a plurality of virtual world layers 112 providing further functionality to the base layer 108 through a plurality of applications 114 (e.g., applications 1-9). The layer-partitioned virtual world system 100 further comprises a plurality of third-party software engines 116 hosted on corresponding third-party server computing devices 118 and providing services to the applications 114 in the plurality of virtual world layers 112.

Furthermore, the layer-partitioned virtual world system 100 comprises one or more client devices 120 used by one or more users 122 receiving and displaying a composite of virtual frames corresponding to the base layer 108 and virtual frames and further functionalities of one or more installed, subscribed to and activated virtual world layers 114. In some embodiments, said composite is performed per client instance based on the field of view of a user 122 or user avatar in the persistent virtual world system 110.

In the current disclosure, the term "virtual frame" refers to one of the many elements (e.g., still images) that compose a virtual animation or other virtual presentation, which may be included in a media stream conveying digital content of a digital reality application. For example, the virtual frames may be or may include virtual sprites, or two-dimensional bitmaps that are integrated into one larger scene. When the virtual animation is displayed, each virtual frame is flashed to users on the pre-determined locations for a short time. The position and orientation at which the virtual frames are displayed to users depend on the viewing position and orientation of the users, which may be sensed by sensors installed in the user devices. The plurality of virtual frames may be composited (as described below) in order to generate a unified media stream to the user device that may be viewed and interacted with by a user. The media stream may include digital reality content including 3D image data, 3D geometries, 3D entities, 3D sensory data, 3D dynamic objects, video data, audio data, textual data, time data, positional data, orientational data, haptic data, and lighting data, amongst others.

In the current disclosure, the virtual world layers 112 refer to a virtual abstraction separating different functionality that is provided to the base layer 108 and which may be visible to users 122 by accessing the persistent virtual world system 110. The virtual abstraction may comprise middleware connecting and providing services to the plurality of applications 114 in the corresponding virtual world layers 112. Interactions in the virtual world layer 112 affecting the base layer 108 can pass through the virtual world layer 112 to the base layer 108.

In some embodiments, the plurality of virtual objects are virtual replicas of real world objects. In other embodiments, the virtual objects are purely virtual objects not existing in the real world. In yet further embodiments, the virtual objects are combinations of virtual replicas and purely virtual objects. The virtual replicas of the current disclosure refer to a virtual version, or virtual twin, of a real-world element, or real twin, which may either be mapped or modeled through computer assisted drawing (CAD) or computer-assisted engineering (CAE) methods. Other methods may include an image-scanning pipeline to be input through a variety of photo, video, depth measurements, and/or simultaneous location and mapping (SLAM) scanning in order to model the virtual replicas; radar-imaging, such as synthetic-aperture radars, real-aperture radars, Light Detection and Ranging (LIDAR), inverse aperture radars, monopulse radars, and other types of imaging techniques; and the like. In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

In other embodiments, some of the real world objects comprise devices capturing real-world data that is transmitted to corresponding virtual replicas, enriching and synchronizing the virtual replicas with the corresponding real world objects.

In the current disclosure, the term "enriching" is used to describe the act of providing further properties to a virtual replica based on the data. For example, enriching the virtual replicas may refer to providing real-world data captured from mechanisms on a plurality of devices, wherein the further real-world data comprises video data, temperature data, real-time energy consumption data, real-time water consumption data, speed or acceleration data, and the like.

In some embodiments, connection between cloud server computers 102 and the one or more third-party server computing devices 118 is performed through a network 124. The network 124 may include, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), and wireless fidelity (WiFi), satellite, mobile ad-hoc network (MANET), and the like.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through 5th generation wireless systems communication (5G). In other embodiments, the system may connect through a wireless local area networking (Wi-Fi) providing data at, e.g., 60 GHz. Provided communication systems may allow for low (e.g., about 1 to about 5 milliseconds) end-to-end (E2E) latency and high (e.g., 1-10) Gbps downlink speeds to end points in the field, complying with parameters typically used for executing the typically highly-interactive digital reality applications. This results in high-quality, low latency, real-time digital application content streaming. In other embodiments, the system may communicatively connect through 4th generation wireless systems communication (4G), may be supported by 4G communication systems, or may include other wired or wireless communication systems.

Figure 2:
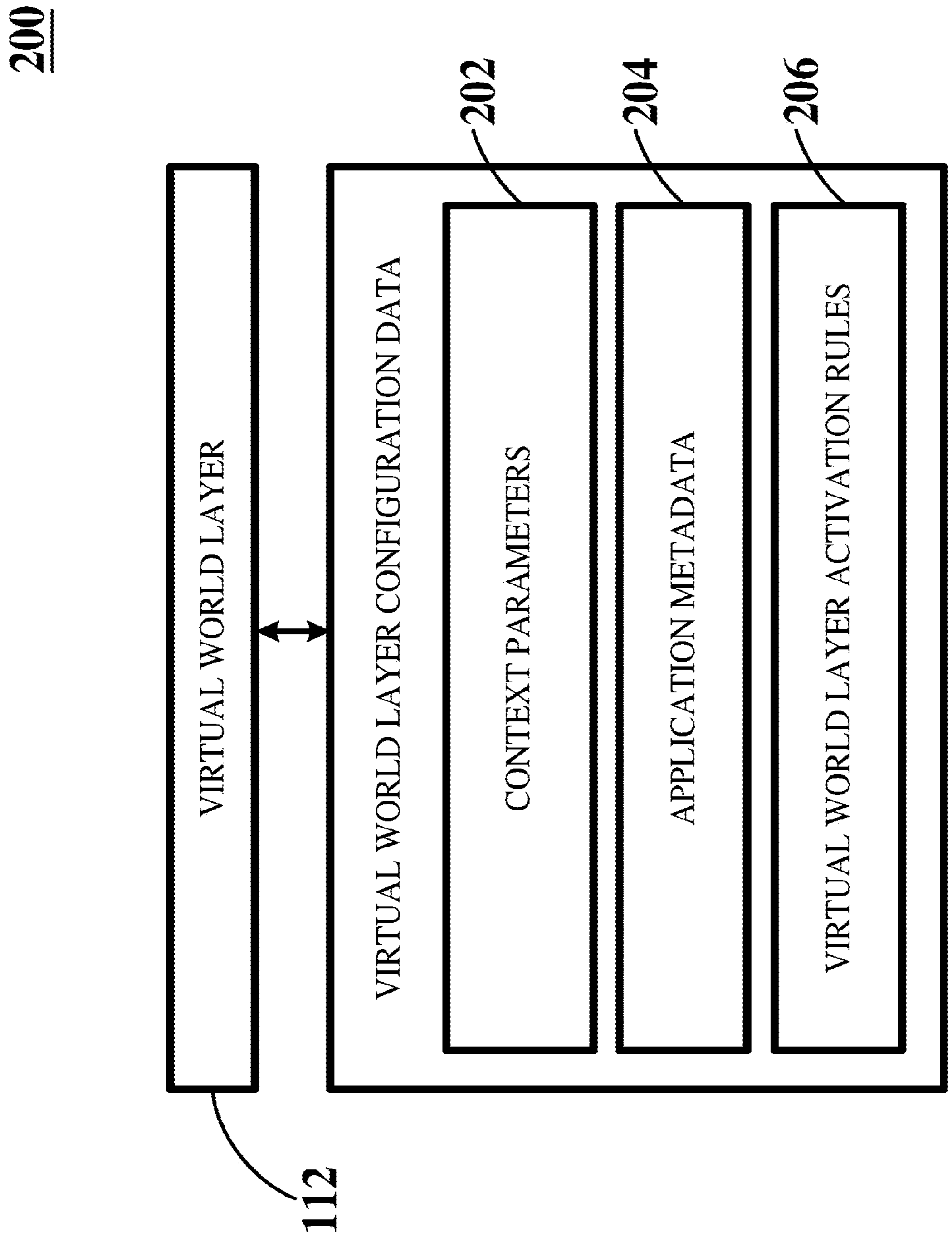
FIG. 2 depicts a schematic representation of virtual world layer configuration data that each virtual world layer may comprise, according to an embodiment.

FIG. 2 depicts a schematic representation of virtual world layer configuration data 200 that each virtual world layer 112 may comprise, including context parameters 202, application metadata 204 and virtual world layer activation permission rules 206, according to an embodiment. Some elements of FIG. 2 might refer to the same or similar elements from FIG. 1, and therefore may comprise the same reference numerals to refer to these elements.

The context parameters 202 refer to a plurality of rules defining the behavior of a specific virtual world layer 112, which will be described in FIG. 3. Application metadata 204 comprises application-related data that may serve to identify and locate the application in question and retrieve the desired application content. For example, the application metadata 204 may comprise application type (e.g., contextual theme), application server location, author, comments and revisions. Virtual world layer activation permission rules 206 refer to rules determining when and how a virtual world layer is to be activated. These permission rules may be selected by a user after the installation and subscription to one or more virtual world layers. Virtual world layer activation permission rules 206 are further described in FIG. 4.

Figure 3:
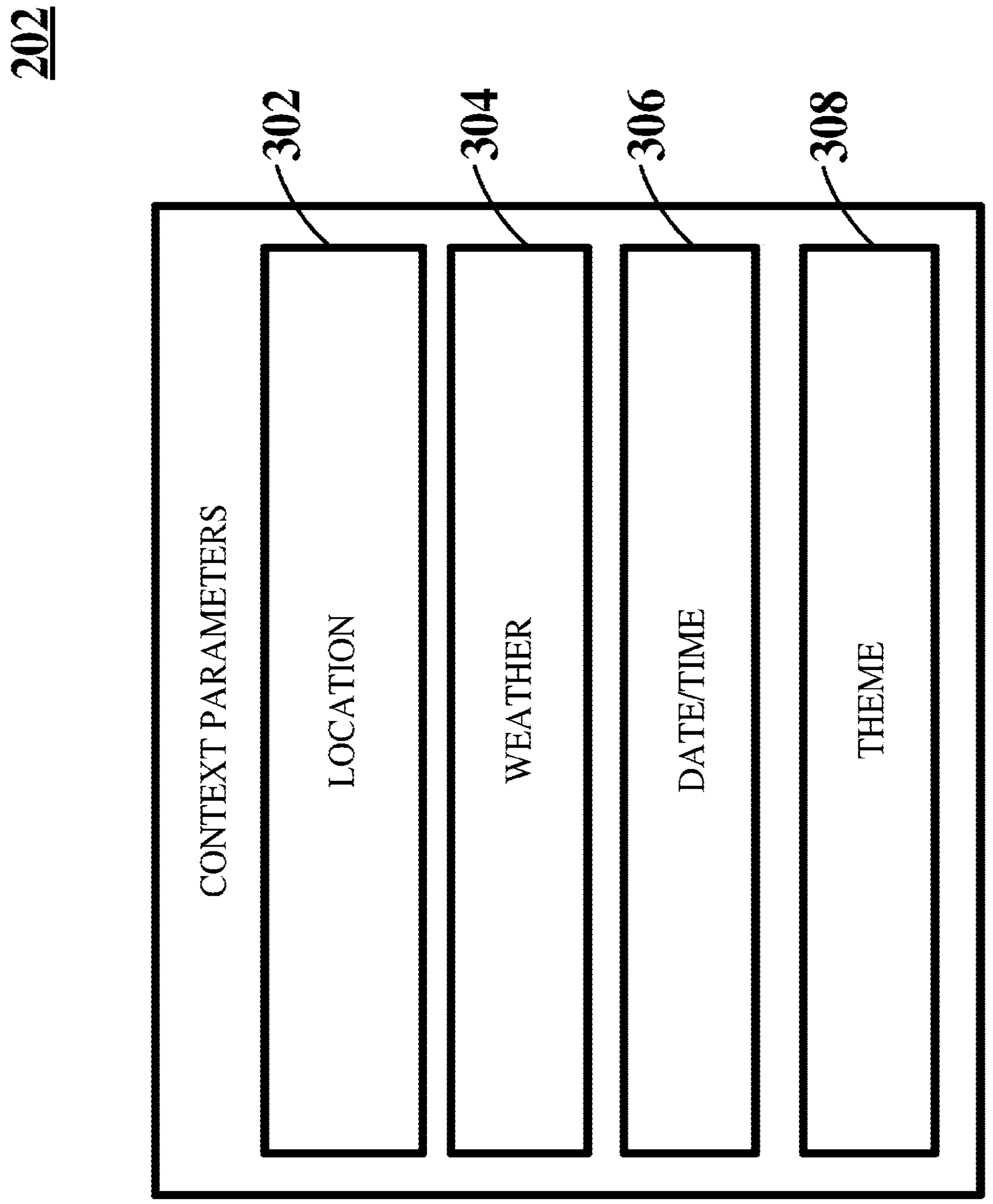
FIG. 3 depicts a schematic representation of context parameters, according to an embodiment.

FIG. 3 depicts a schematic representation of context parameters 202, according to an embodiment. Some elements of FIG. 3 might refer to the same or similar elements from FIG. 1 to FIG. 2, and therefore may comprise the same reference numerals to refer to these elements.

Context parameters 202 may comprise location 302, referring to two-or-three dimensional geographical coordinates where a virtual world layer may be activated; weather conditions 304, referring to weather data such as temperature, humidity, wind speed, pollution rate, etc., that may determine virtual world layer activation; date and/or time 306; and contextual theme 308, referring to specific topics that may be included in the layer and which may determine the type of functionality and associated applications that may be provided to users during virtual world layer activation. Sample contextual themes 308 may be dating, health, gastronomy, learning, entertainment, working, and the like. The context parameters 202 may be compared to a user state obtained from the client device to determine virtual world layer activation. The user state may comprise, for example, the user location, user location weather conditions, user location date and/or time, and user theme preferences.

Figure 4:
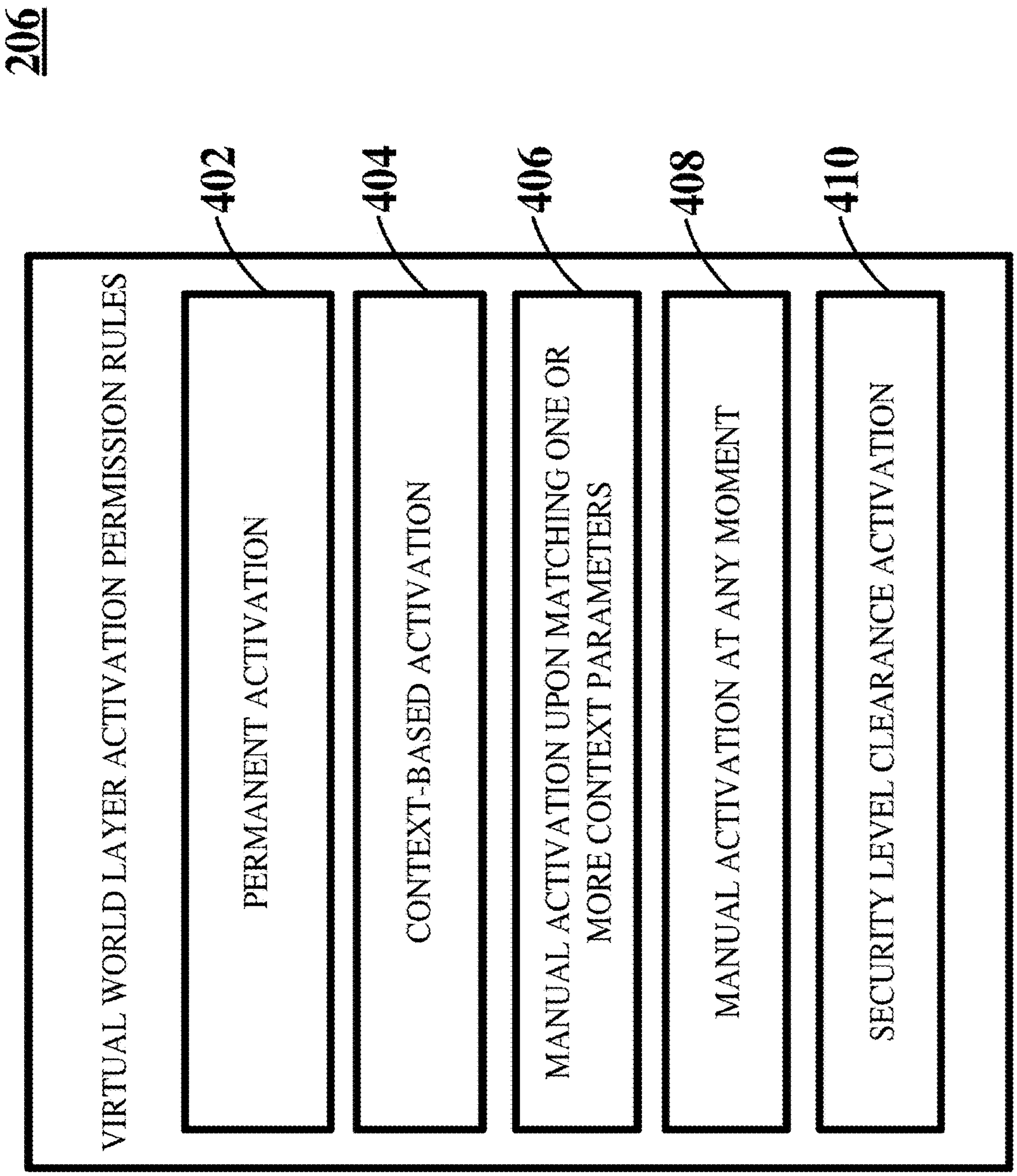
FIG. 4 depicts a schematic representation of virtual world layer activation permission rules, according to an embodiment.

FIG. 4 depicts a schematic representation of virtual world layer activation permission rules 206, according to an embodiment. Some elements of FIG. 4 might refer to the same or similar elements from FIG. 1 to FIG. 3, and therefore may comprise the same reference numerals to refer to these elements.

The virtual world layer activation permission rules 206 may comprise one or more of a permanent activation 402, context-based activation 404, manual activation upon matching one or more context parameters permission rule 406, manual activation at any moment 408, and security level clearance activation 410.

The permanent activation 402 enables a specific virtual world layer to be active at all moments. For example, a restaurant recommendation layer may be permanently activated so that any restaurant pertaining to that layer may be highlighted to a user at all moments.

Context-based activation 404 refers to activation of the virtual world layer depending on the context parameters. For example, the virtual world layer may be activated when the layer context parameters match the user state, as described with reference to FIG. 3.

The manual activation upon matching one or more context parameters permission rule 406 refers to activation by a user through the client device once a context parameter has been matched. The user may first receive a notification from or through the at least one cloud server computer stating that a context parameter has been matched and that, with the explicit user authorization, the virtual world layer may be activated.

Manual activation at any moment 408 enables the activation of a virtual world layer at any point in time by a user.

Finally, security level clearance activation 410 requires an official authorization in order for a virtual world layer to be activated, which may be required with high level security virtual world layers that may be used only by, e.g., state authorities, national security positions, personnel managing with sensitive information (e.g., researchers or scientists), and the like. The security level clearance may require a user authentication every time the virtual world layer may be activated, which may take the form of a biometric authentication, password input, passport check, decryption key input, and the like.

Figure 5:
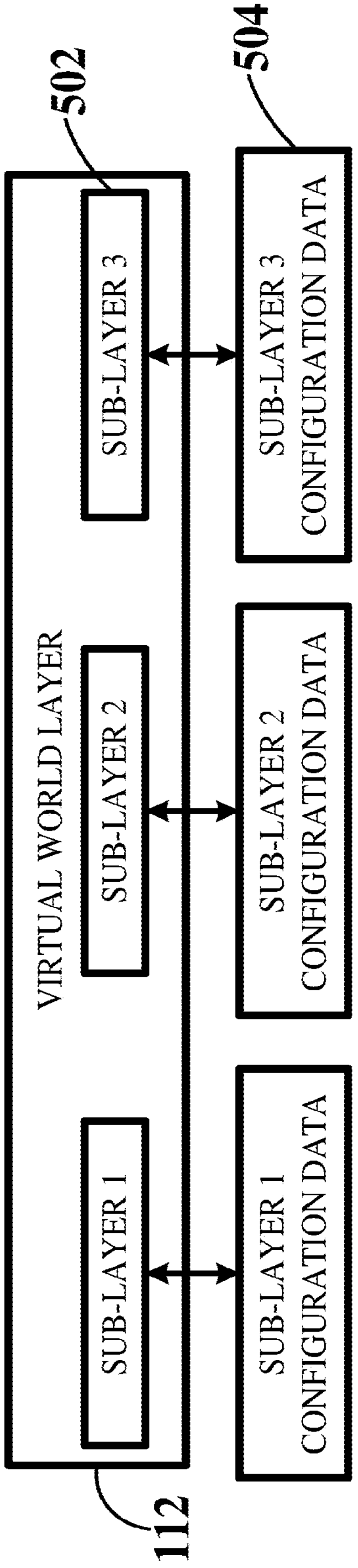
FIG. 5 depicts a schematic diagram of a sub-layer partitioned system, according to an embodiment.

FIG. 5 depicts a schematic diagram of a sub-layer partitioned system 500, according to an embodiment. Some elements of FIG. 5 might refer to the same or similar elements from FIG. 1 to FIG. 4, and therefore may comprise the same reference numerals to refer to these elements.

In FIG. 5, a virtual world layer 112 is sub-partitioned into sub-layers 502 (e.g., sub-layers 1-3), wherein each sub-layer 502 comprises a corresponding sub-layer virtual world layer configuration data 504 (e.g., sub-layer virtual world configuration data 1-3). The sub-layer virtual world layer configuration data 504 may comprise data categories similar to those of the virtual world layer configuration data 200 shown with reference to FIG. 2. For example, if contextual themes 308 of FIG. 2 are dating, health, gastronomy, learning, entertainment, working, and the like, sub-layer contextual themes may be sub-categories of each of those contextual themes 308. Further in this example, a dating sub-layer contextual theme may comprise one or more standard dating applications, blind-date applications, speed-dating applications, and the like, and may highlight potential matches in places where the dating sub-layer may be activated. Health sub-layer contextual themes may comprise, for example, insurance applications, hospital applications, pharmaceutical applications, mindfulness or meditation applications, medicine-related applications, nutrition information applications, and the like. Gastronomy sub-layer contextual themes may comprise, for example, restaurant recommendations, recipe recommendations, and the like. Learning sub-layer contextual themes may comprise any type of learning applications in the language, academic, cultural, or other fields. The entertainment sub-layer contextual themes may refer to movie applications, game applications, sports applications, and the like. The working sub-layer may comprise, for example, conferencing applications, remote office applications, and the like.

With reference to FIG. 1 to FIG. 5, in various embodiments, the virtual world layers 112 are configured based on virtual world layer configuration data 200 on the one or more cloud server computers 102. In these embodiments, receiving the further functionality from the virtual world layers 112 comprises receiving, from a client device 120, a virtual world layer activation permission selected from, for example, the virtual world layer activation permission rules 206 in FIG. 2 and FIG. 4; receiving a user state from the one or more client devices 120; comparing the user state with the selected virtual world layer activation permission rule to check whether a virtual world layer activation permission rule is met; if a virtual world layer activation permission rule is met, activating one or more virtual world layers 112; accessing the corresponding application metadata 204; retrieving, based on the application metadata 204, application services from one or more applications 114 associated to a further functionality provided by the corresponding one or more software engines 116 hosted on corresponding third-party server computing devices 118; and providing the further functionality comprising application data and services to the one or more client devices 120 through the one or more cloud server computers.

The application metadata 204 provides the information configured to enable access to the application data and services in each of the corresponding third-party server computing devices 118 in order to retrieve the application data and services associated to the further functionality of the virtual world layer 112. The application data and services are received by the virtual world layer 112 in the cloud server 102, provisioning the further functionality to one or more client devices 120 accessing the corresponding virtual world layer 112 through the persistent virtual world system 110. Therefore, in this embodiment, the virtual world layer configuration data 200 is not included in the third-party server computing devices 118, but only in the cloud server computer 102.

For example, a virtual world layer 112 may be configured in the at least one cloud server computer 102 as virtual world layer 1 comprising a corresponding virtual world layer configuration data 200. In this example, activation of the virtual world layer 1 may be defined by a context-based permission rule 404 comprising a context parameter 202 of a location 302 between specific geographic coordinates. The one or more cloud server computers 102 receive the state of a user sent by a client device 120, and compares the user state with the configured geographic location of the virtual world layer 1. If the client device 120 is located within the specified geographic coordinates of the virtual world layer 1, the cloud server computer 102 then activates the virtual world layer 1, accesses the corresponding application metadata 204; retrieves, based on the application metadata 204, application services from one or more applications 1-3 associated to a further functionality provided by the third-party software engine 116 hosted on corresponding third-party server computing device 118; and provides the services to the one or more client devices 120.

In other embodiments, the virtual world layers 112 are configured with corresponding virtual world layer configuration data 200 on the one or more third-party server computing devices 118 with the further functionality from corresponding virtual world layers 112 and associated applications 114. In these embodiments, receiving the further functionality comprises receiving, from a client device 120, a virtual world layer activation permission rule; receiving a user state from the one or more client devices 120; comparing the user state with virtual world layer activation permission rules stored in the one or more third-party server computing devices 118 to check whether a virtual world layer activation permission rule is met; if a virtual world layer activation permission rule is met, retrieving application services associated to a further functionality provided by the corresponding one or more software engines 116 hosted on corresponding third-party server computing devices 118; and providing the further functionality to the one or more client devices 120 through the one or more third-party server computing devices 118.

For example, a virtual world layer 112 may be configured and hosted on the third-party server computing device 118 as virtual world layer 2 including all functionality provided by applications 4-6. In this example, activation of the virtual world layer 2 may be defined by a manual activation upon matching one or more context parameters permission rule 406. When the virtual world layer 2 is deactivated, the cloud server 102 may have no information about the functionality of virtual world layer 2. For instance, considering a theme context parameter 308 of gastronomy and a sub-layer 502 comprising sub-layer virtual world layer configuration data 504 including a restaurant sub-theme, when a user is close to one or more restaurants (e.g., restaurants of a specific category specified by the user or restaurants in general, as predefined by the user), the user may receive a notification from the virtual world layer 112 on the third-party server computing device 118 alerting the user of an available virtual world layer. If the user decides to manually activate the virtual world layer 2, the third-party server computing device 118 then activates the virtual world layer 2, retrieves application services from one or more applications 4-6 associated to a further functionality provided by the third-party software engine 116; and provides the services to the one or more client devices 120 via the one or more cloud server computers 102. Configuring the virtual world layers 112 on the one or more third-party server computing devices 118 may provide a higher confidentiality level of data of the corresponding virtual world layers 112, such as in cases where the applications and corresponding functionalities are aimed at specific groups of people that may require high security levels.

Figure 6A:
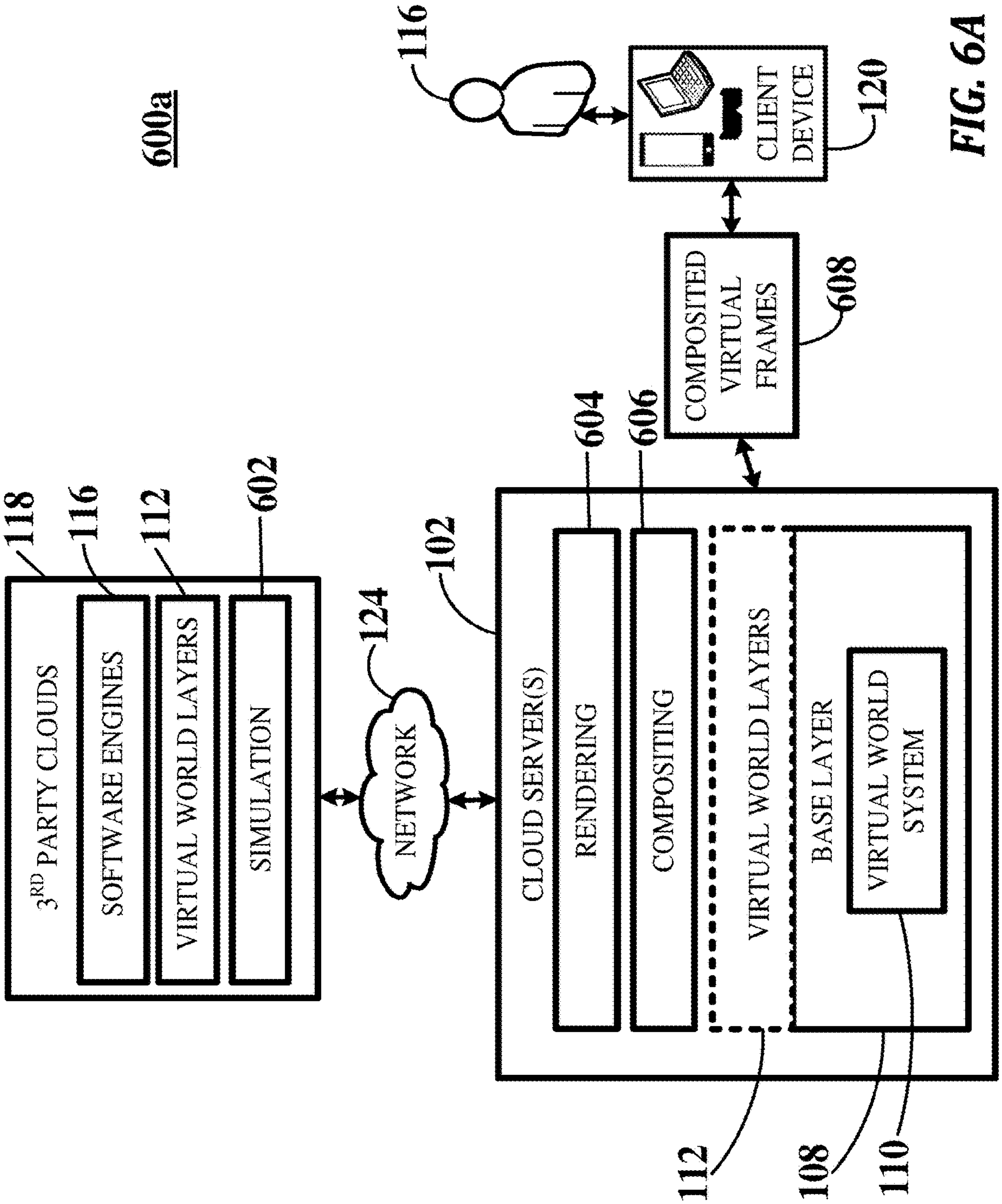
FIG. 6A to FIG. 6C depict a schematic diagram representing several embodiments of task distribution among elements of the layer-partitioned virtual world system, according to various embodiments.
Figure 6B:
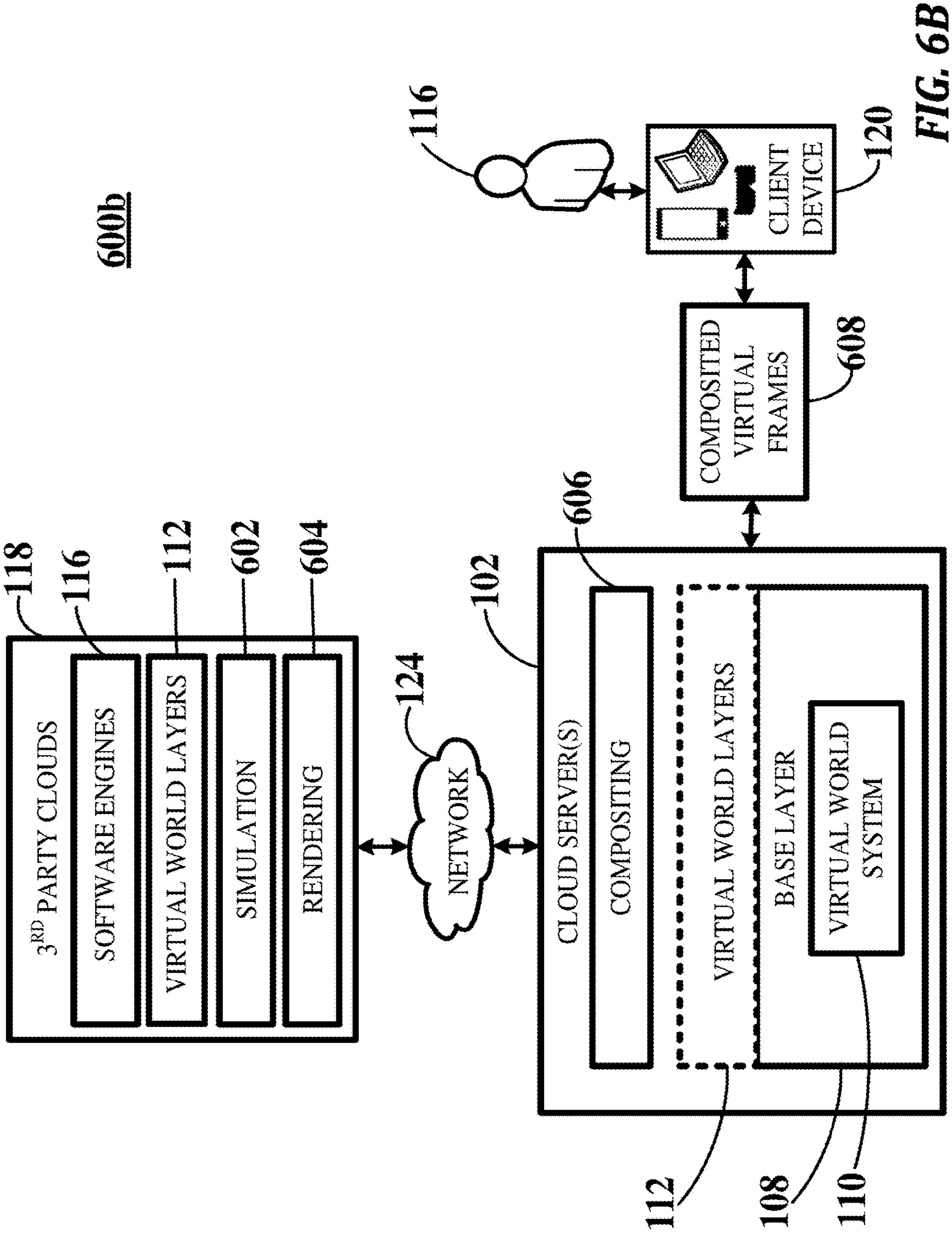
Figure 6C:
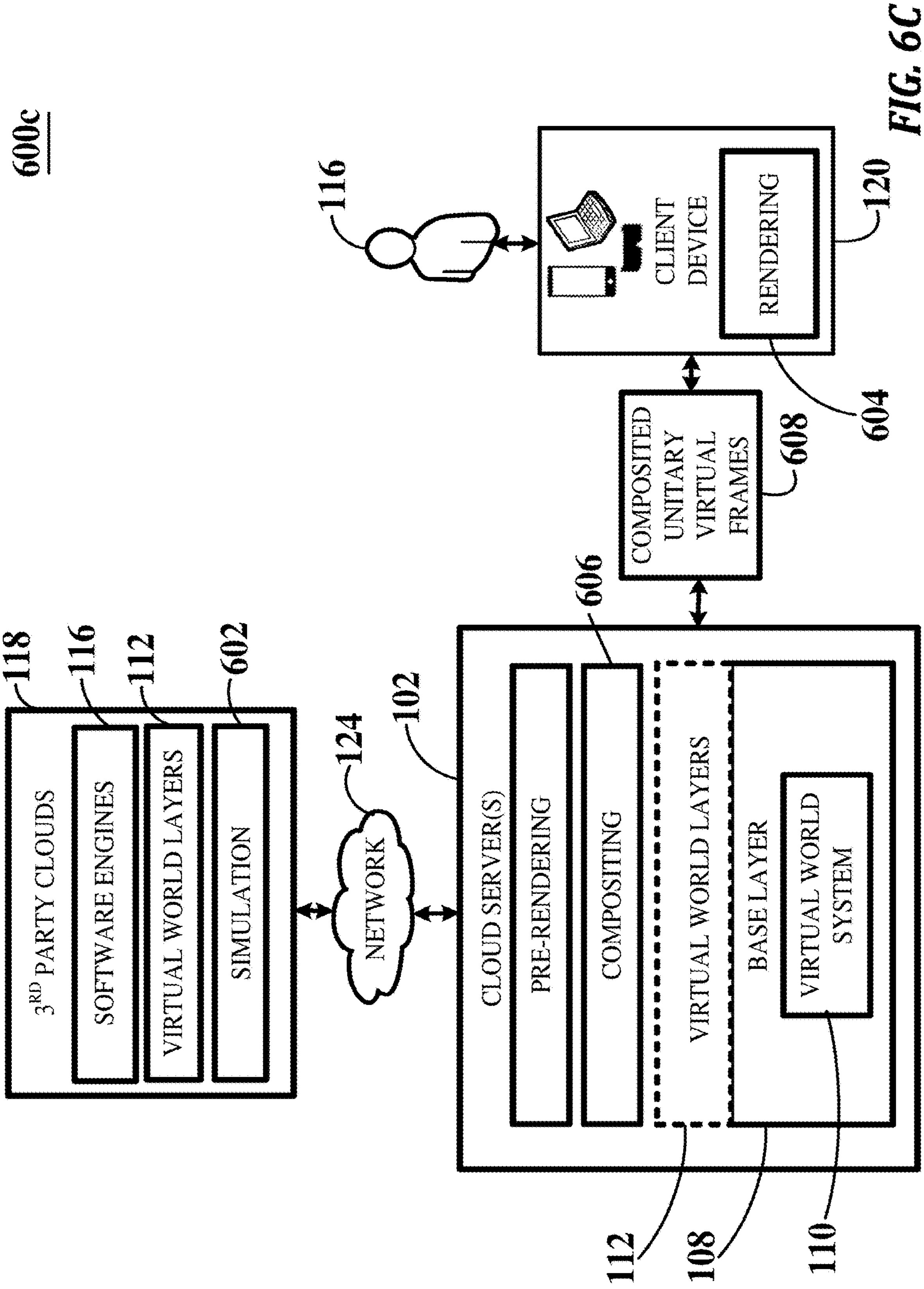

FIG. 6A to FIG. 6C depict schematic diagrams representing several embodiments of task distribution among elements of layered virtual world systems 600*a*-600*c*, according to various embodiments. Some elements of FIG. 6A to FIG. 6C might refer to the same or similar elements from FIG. 1 to FIG. 5, and therefore may comprise the same reference numerals to refer to these elements.

In the layered virtual world systems 600*a*-600*c*, the one or more services provided by the plurality of third-party software engines 116 comprise at least simulation services 602 and rendering services 604 used in the creation and run-time execution of the applications, while compositing services 606 that composite the virtual world layer virtual frames and base layer virtual frames into unitary virtual frames is done by the at least one cloud server computer 102, generating composited virtual frames 608 that are sent to the client devices 120. However, simulation services 602 and rendering services 604 may be alternated between third-party software engines 116, cloud server computers 102 and client devices 120 depending on the load of the applications and application content to be delivered to the one or more client devices 120, network traffic status and rules, latency, desired quality of service (QOS), confidentiality level of the application content, etc. In some embodiments, the levels of each of the simulation services 602 and rendering services 604 may be adjusted in real-time based on the aforementioned factors. In some embodiments, other combinations of task distribution not reflected below may also be considered.

In one embodiment, with reference to FIG. 6A, the plurality of third-party software engines 116 are configured to provide simulation services to the applications in the corresponding virtual world layers 112 and transmit the simulated application content to the at least one cloud server computer 102. In this embodiment, the at least one cloud server computer 102 is configured to receive the simulated application content from the virtual world layers 112 sent by the third-party software engine 116; implement final rendering on the simulated application content from the virtual world layers 112; composite the virtual world layer virtual frames and base layer virtual frames into unitary virtual frames; and transmit the composited virtual frames 608 to the one or more client devices 120.

In another embodiment, with reference to FIG. 6B, the plurality of third-party software engines 116 are configured to provide simulation services 602 and rendering services 604 to the applications in the corresponding virtual world layers 112 and transmit the simulated and rendered application content to the at least one cloud server computer 102 in rendered frames corresponding to each virtual world layer. In this embodiment, the at least one cloud server computer 102 is configured to receive the simulated application content and rendered frames from the virtual world layers 112 sent by the plurality of third-party software engines 116; render the base layer 108; composite the virtual world layer virtual frames and base layer virtual frames into unitary virtual frames; and transmit the composited virtual frames 608 to the one or more client devices 120.

In yet another embodiment, with reference to FIG. 6C, the plurality of third-party software engines 116 are configured to provide simulation services 602 to the applications in the corresponding virtual world layers 112 and transmit the simulated application content to the at least one cloud server computer 102. In this embodiment, the at least one cloud server computer 102 is configured to receive the simulated application content from the virtual world layers 112 sent by the plurality of third-party software engines 116; pre-render the simulated application content from the virtual world layers 112 and the base layer 108; composite the pre-rendered virtual world layer virtual frames and base layer virtual frames into unitary virtual frames; and transmit the composited virtual frames 608 to the one or more client devices 120 for implementing final rendering services 604.

Figure 7:
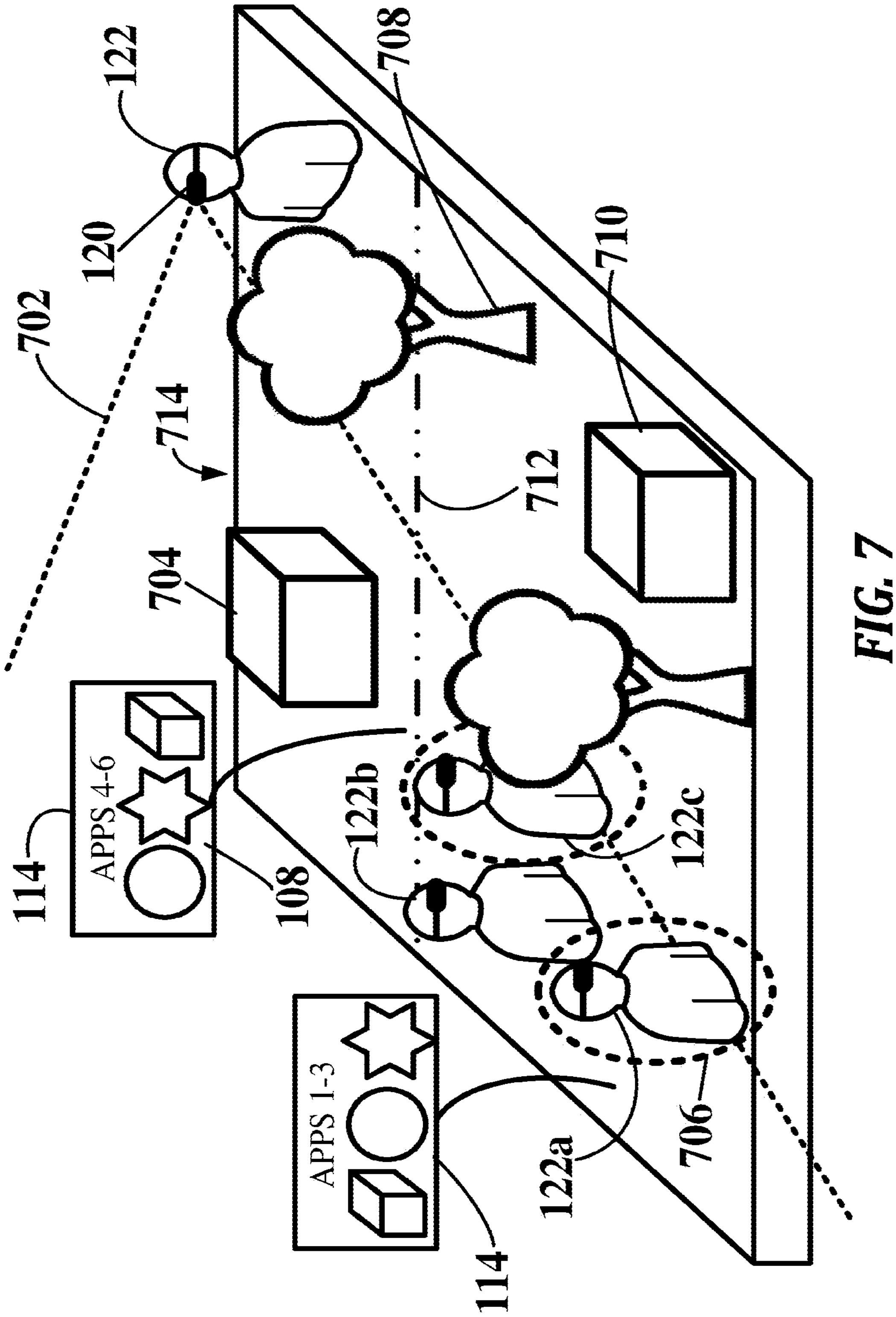
FIG. 7 depicts a schematic diagram of a sample layered virtual world system as viewed by a user in a digital reality, according to an embodiment.

FIG. 7 depicts a schematic diagram of a sample layered virtual world system 700 as viewed by a user in a digital reality, according to an embodiment. Some elements of FIG. 7 might refer to the same or similar elements from FIG. 1 to FIG. 6A-FIG. 6C, and therefore may comprise the same reference numerals to refer to these elements.

In the layered virtual world system 700, a user 122 views in a direction wherein the field of view 702 comprises a plurality of applications 114 (e.g., applications 1-3 and applications 4-6), each comprising a corresponding graphical representation; a plurality of users 122*a-c*; and one virtual replica 704 comprised in the persistent virtual world system (e.g., persistent virtual world system 110 of FIG. 1). By way of example, applications 1-3 may receive application data and services from one third party software engine while applications 4-6 may receive application data and services from another third party software engine. The distribution of tasks may be implemented in various ways and alternated and/or adjusted in real-time, as described with reference to FIG. 6A to FIG. 6C.

The user 122 may receive through his or her client device 120 (e.g., a head-mounted display or AR/VR goggles, as illustrated in FIG. 7) composited unitary virtual frames comprising all the elements within the field of view of the user 122. Further in the example illustration of FIG. 7, the plurality of users 122*a-c* within the field of view 702 of the user 122 may be represented either as the real users (e.g., in augmented reality without comprising a digital element attached to them), as user avatars (e.g., in virtual reality, comprising virtual elements attached to the users), or combinations thereof (e.g., some users being viewed in real form while others being viewed as user avatars). Virtual world layer highlights 706 (e.g., a light or shade of any color) may be placed around one or more of the users 122*a-c* within the field of view 702 when the users 122*a-c* are part of a virtual world layer 112 that has been activated. For example, two of the users, 122*a* and 122*c* may be suitable for engaging in conversations regarding a specific theme (e.g., theme 308 of FIG. 3) shared in common with the user 122 and, when the corresponding virtual world layer is activated, the two users 122*a* and 122*c* may be highlighted accordingly for the user 122 to note them.

The virtual replica 704 may represent a real-world element and may be comprised within the base layer including the elements of the persistent virtual world system. Other elements outside the field of view 702 of the user 122 (e.g., trees 708 and box 710) may not be rendered, simulated and composited for the user 122 until included within the field of view 702 at a later point, such as when the user 122 turns his or her head in the direction of those elements. In some embodiments, the composited unitary virtual frames are performed per client instance based on the field of view of the user 122 or user avatar in the persistent virtual world system.

A virtual world layer division 712 may be set when a virtual world layer 714 is configured by a context parameter of location (e.g., location 302 of FIG. 3). For example, when the user 122 is located within the geographical coordinates set for the location context parameter, if the virtual world layer activation permission rule permits it (e.g., through a context-based activation 404 or a manual activation upon matching one or more context parameters permission rule 406), then the virtual world layer 714 may be activated, highlighting the virtual world layer 714 in any predetermined manner.

Figure 8:
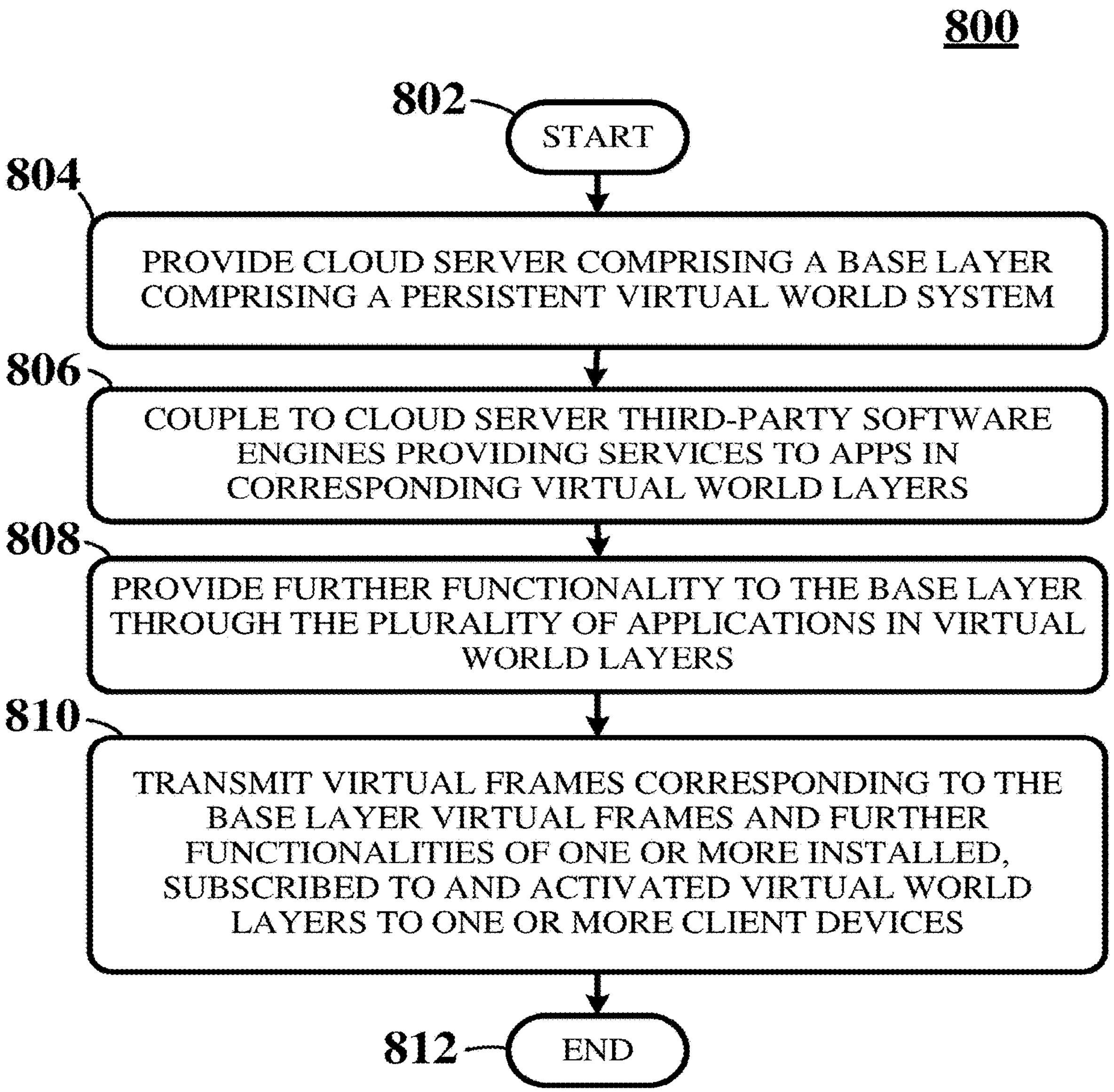
FIG. 8 depicts a schematic diagram of a method for providing a layer-partitioned virtual world system, according to an embodiment.

FIG. 8 depicts a schematic diagram of a method 800 enabling a layered virtual world system, according to an embodiment. Method 800 may be implemented by a system, such as systems described with reference to FIG. 1 to FIG. 6A-FIG. 6C.

Method 800 may begin in step 802 and step 804 by providing at least one cloud server computer comprising at least one processor and memory storing a base layer comprising a persistent virtual world system including a plurality of virtual objects. The method 800 continues in step 806 by coupling, to the at least one cloud server via a network, at least one third-party cloud server computer via a network, the at least one third party cloud server computer hosting a plurality of third-party software engines providing services to a plurality of applications in corresponding plurality of virtual world layers. The method 800 may continue in step 808 by providing, by the virtual world layers, further functionality to the base layer of the at least one cloud server through the corresponding plurality of applications. In step 810, the method 800 may continue by transmitting, by the at least one cloud server computer, virtual frames corresponding to the base layer virtual frames and further functionalities of one or more installed, subscribed to and activated virtual world layers to one or more client devices. The method 800 may then end at a terminator 812.

In some embodiments, the method 800 further comprises overlapping two-or-three dimensional graphical representations from the virtual world layers on top of the base layer.

In some embodiments, the method 800 further comprises defining the virtual world layers graphically by transparent cutouts separating one virtual world layer from another virtual world layer; upon activating a layer, highlighting the layer graphically; and highlighting all virtual objects comprised within the virtual world layer.

In some embodiments, generating said composite by method 800 comprises obtaining data points related to the field of view of a user or user avatar in the persistent virtual world system; and generating said composite by client instance based on the data points.

Figure 9A:
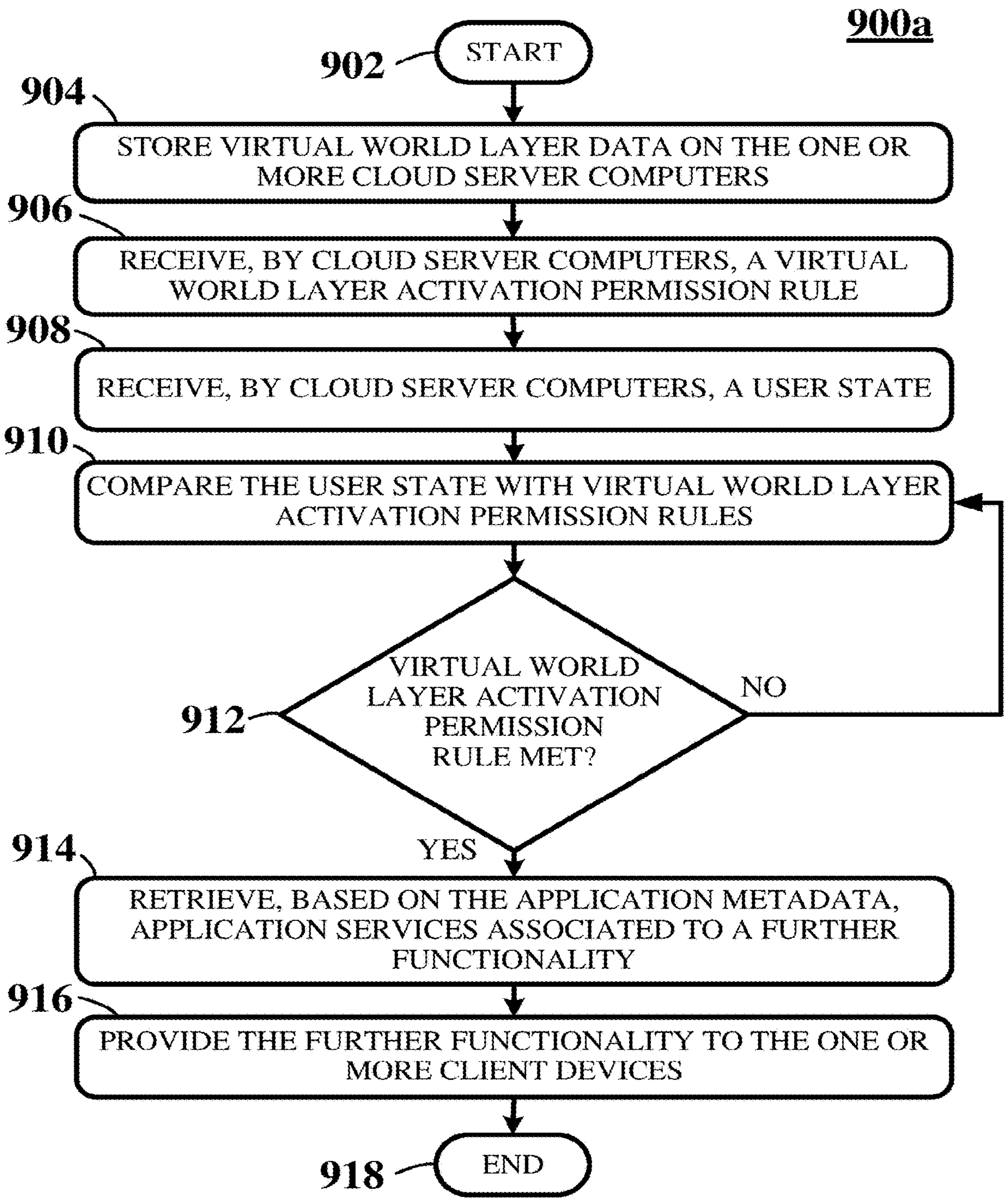
FIG. 9A to FIG. 9B depict block diagrams illustrating various embodiments of methods for providing the further functionality associated to the one or more applications.
Figure 9B:
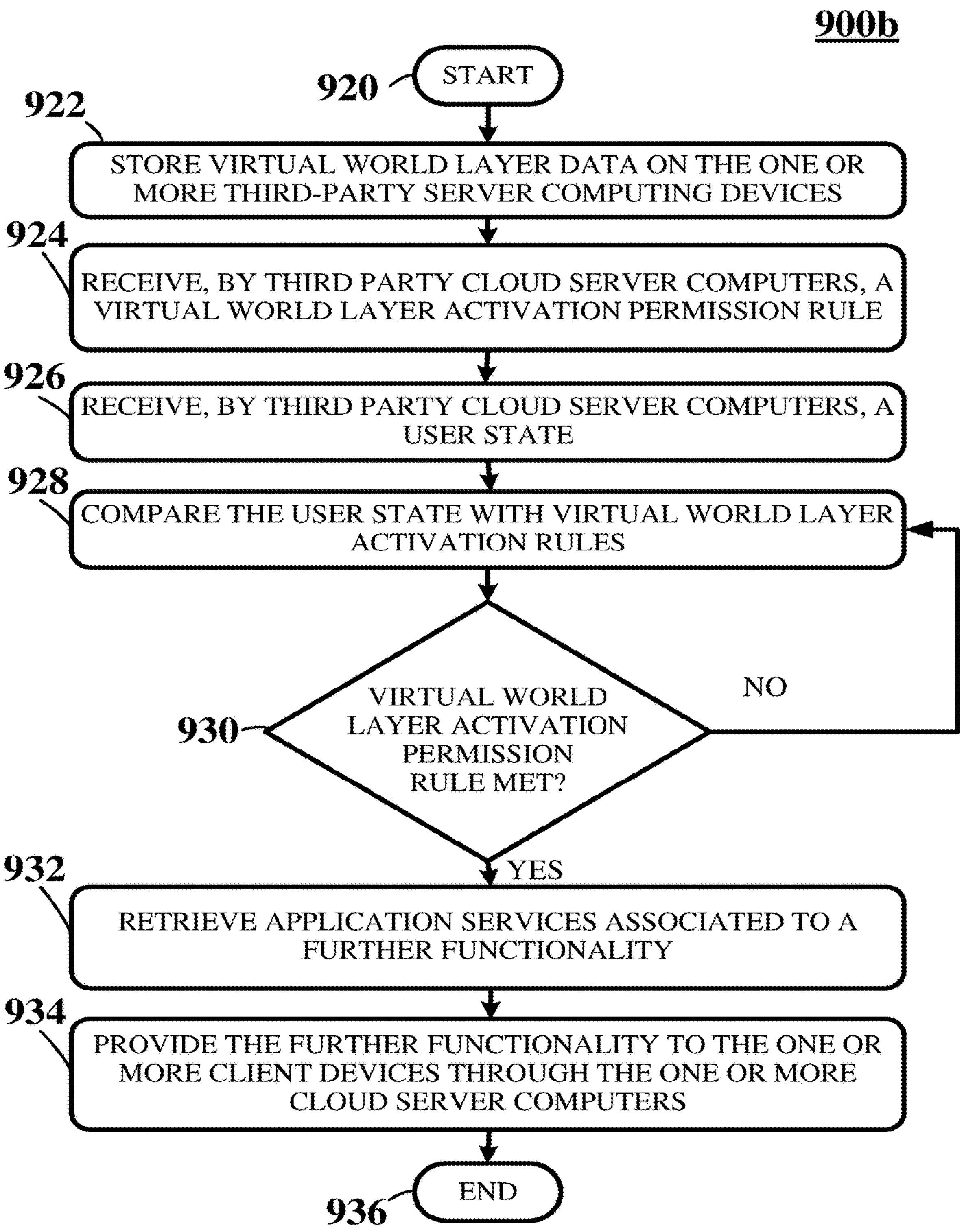

FIG. 9A to FIG. 9B depict block diagrams of methods 900*a*-900*b* illustrating various embodiments for providing the further functionality associated to the one or more applications. Methods 900*a*-900*b* may be implemented by a system, such as systems described with reference to FIG. 1 to FIG. 6A-FIG. 6C.

In FIG. 9A, the virtual world layer configuration data is stored on the one or more cloud server computers, therefore, the client devices access the cloud server computers before receiving the further functionality from the third-party cloud server computers through method 900*a*. Method 900*a* begins in steps 902 and 904 by storing the virtual world layer configuration data on the one or more cloud server computers. In step 906, method 900*a* continues by receiving, by cloud server computers from a client device, a virtual world layer activation permission rule. Then, in step 908, method 900*a* continues by receiving a user state from the one or more client devices. In step 910, the method 900*a* continues by comparing the user state with virtual world layer activation permission rules to check, in step 912, whether a virtual world layer activation permission rule is met. Method 900*a* proceeds in step 914 by retrieving, based on the application metadata, application services associated to a further functionality provided by the corresponding one or more software engines hosted on corresponding third party clouds. Otherwise, if in step 912 a virtual world layer permission activation rule is not met, the method 900*a* loops back to step 910 by comparing the user state with virtual world layer activation permission rules to check. Finally, in step 916 method 900*a* provides the further functionality to the one or more client devices, ending the process in terminator 918.

In FIG. 9B the virtual world layer configuration data is stored on the one or more third-party cloud server computers, therefore, the client devices access the third-party cloud server computers and corresponding virtual world layer configuration data, along with the base layer from the cloud server computers, before receiving the further functionality from the third-party cloud server computers through method 900*b*. Method 900*b* begins in steps 920 and 922 by storing the virtual world layer configuration data on the one or more third-party server computing devices. In step 924, method 900*b* continues by receiving, by the one or more third-party server computing devices from a client device, a virtual world layer activation permission rule. Method 900*b* proceeds in step 926 by receiving a user state from the one or more client devices. In step 928, method 900*b* continues by comparing the user state with virtual world layer activation permission rules stored in the one or more third-party server computing devices to check, in step 930, whether a virtual world layer activation permission rule is met. If a virtual world layer activation permission rule is met, method 900*b* continues, in step 932, retrieving application services associated to a further functionality provided by the corresponding one or more software engines hosted on corresponding third party clouds. Otherwise, if in step 930 a virtual world layer permission activation rule is not met, the method 900*a* loops back to step 928 by comparing the user state with virtual world layer activation permission rules to check. Finally, in step 934, the method 900*b* provides the further functionality to the one or more client devices through the one or more cloud server computers, ending the process in terminator 936.

Figure 10A:
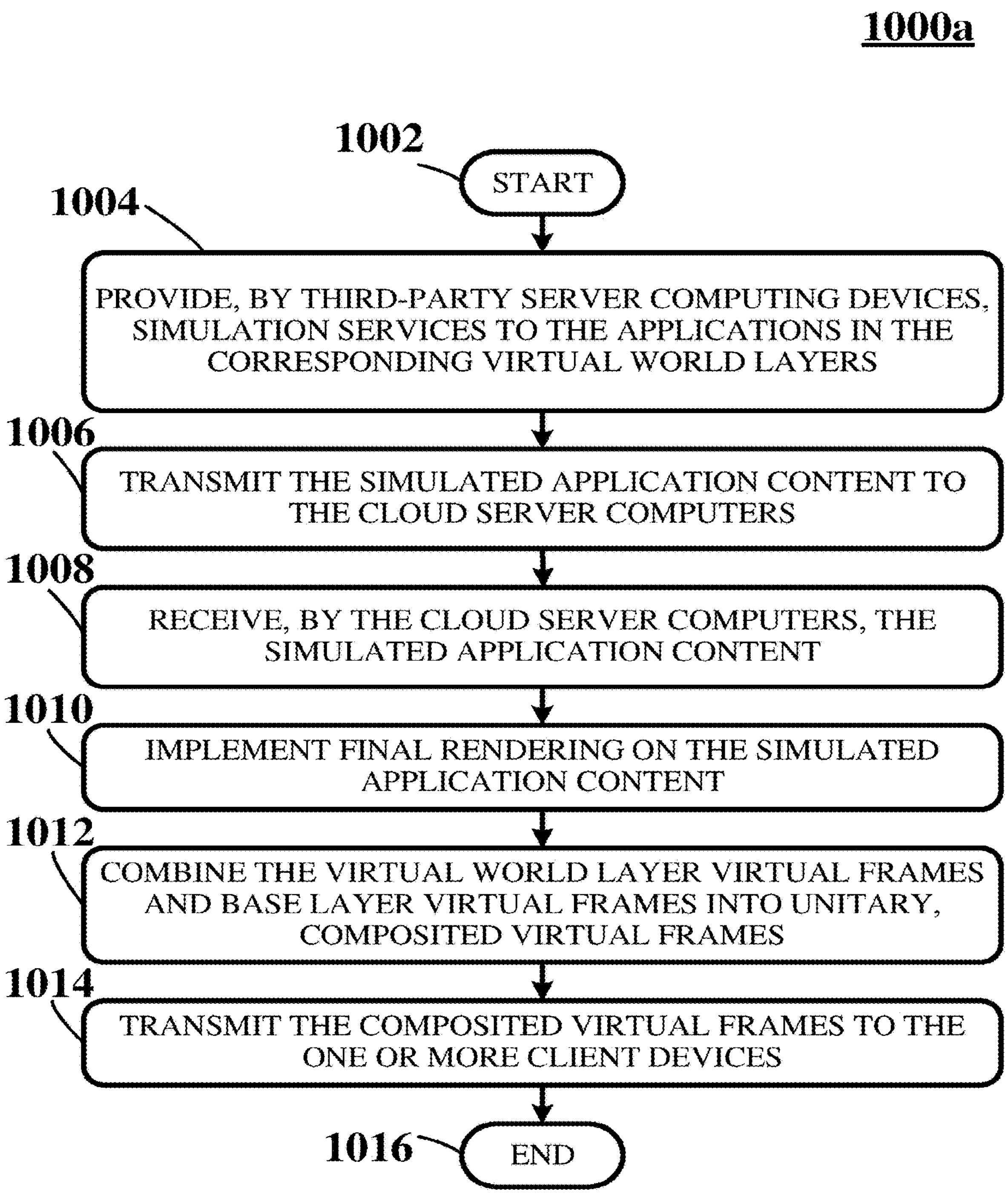
FIG. 10A to FIG. 10C depict block diagrams illustrating several embodiments of methods of task distribution among elements of the layered virtual world systems.
Figure 10B:
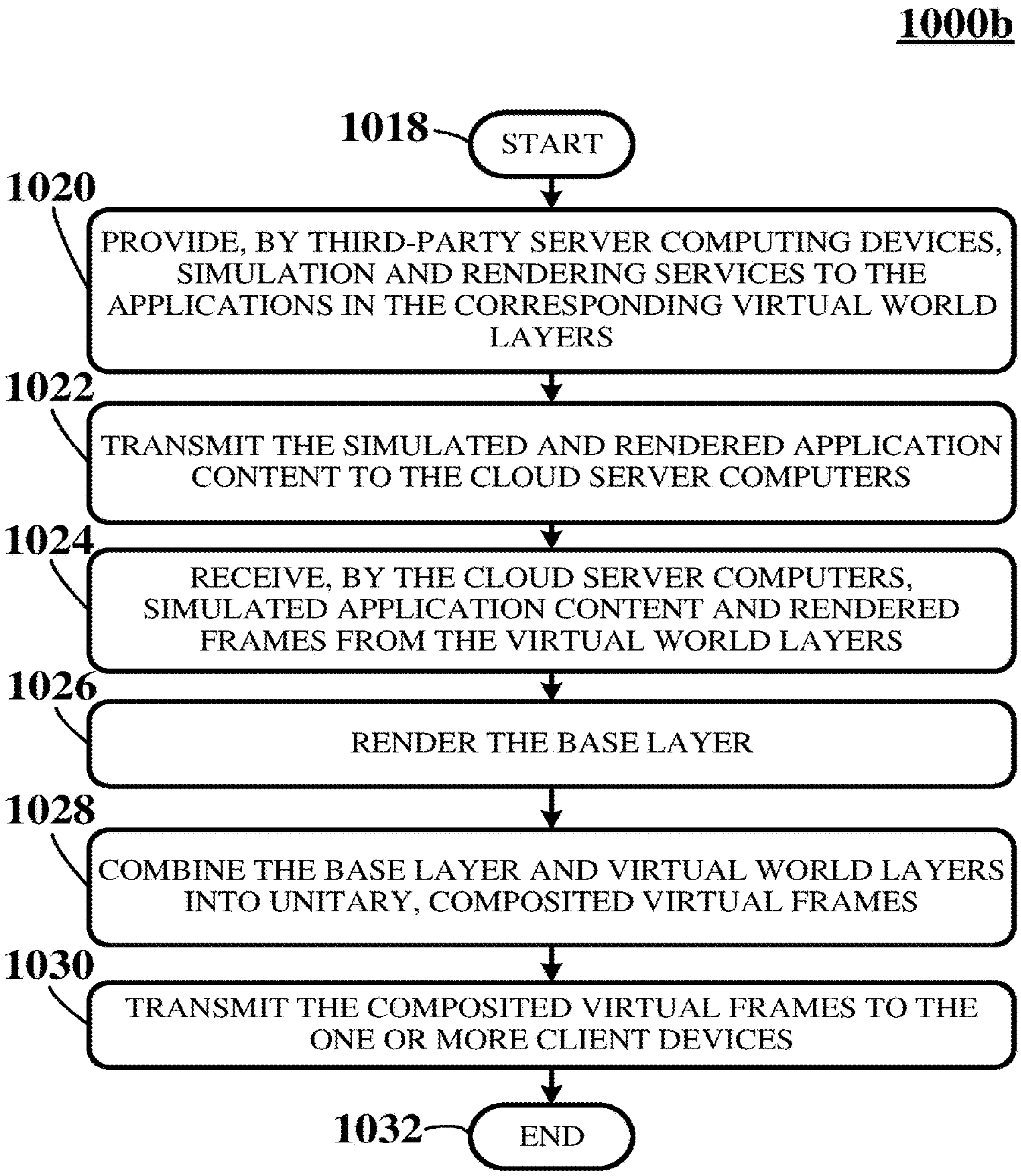
Figure 10C:
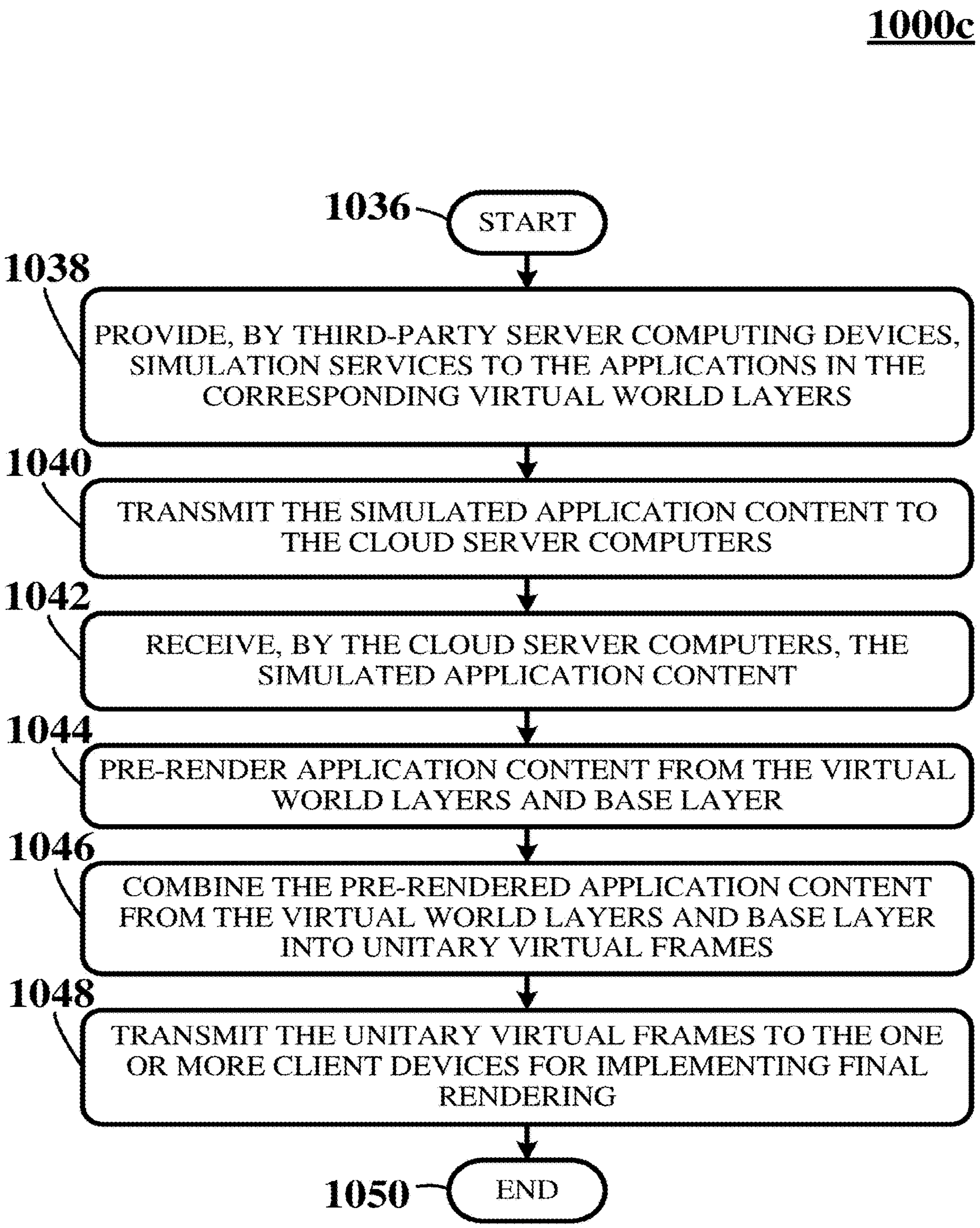

FIG. 10A to FIG. 10C depict block diagrams of methods 1000*a*-1000*c* illustrating several embodiments of task distribution among elements of the layered virtual world systems. Methods 1000*a*-1000*c* may be implemented by a system, such as systems described with reference to FIG. 1 to FIG. 6A-FIG. 6C.

FIG. 10A depicts method 1000*a*, which begins in steps 1002 and 1004 by the third-party server computing devices providing simulation services to the applications in the corresponding virtual world layers. Then, in step 1006, method 1000*a* continues by transmitting the simulated application content to the cloud server computers. In step 1008, the at least one server computer continues method 1000*a* by receiving the simulated application content from the virtual world layers sent by the third-party server computing devices. Subsequently, in step 1010, method 1000*a* proceeds by implementing final rendering on the simulated application content from the virtual world layers. Then, in step 1012, method 1000*a* proceeds by combining the virtual world layer virtual frames and base layer virtual frames into unitary, composited virtual frames. Finally, the method 1000*a* continues in step 1014 by transmitting the composited virtual frames to the one or more client devices, ending the process in terminator 1016.

FIG. 10B depicts method 1000*b*, which begins in steps 1018 and 1020 by the plurality of third-party server computing devices providing simulation and rendering services to the applications in the corresponding virtual world layers. Then, in step 1022, the method 1000*b* continues in step 1022 by transmitting the simulated and rendered application content to the cloud server computers in rendered frames corresponding to each virtual world layer. In step 1024, the method 1000*b* continues by the at least one cloud server computer receiving the simulated application content and rendered frames from the virtual world layers sent by the plurality of third-party server computing devices. In step 1026, the method 1000*b* continues by rendering the base layer, and in step 1028 by combining the base layer and virtual world layers into unitary, composited virtual frames. Finally, in step 1030, the method 1000*b* continues by transmitting the composited virtual frames to the one or more client devices, ending the process in step 1032.

FIG. 10C depicts method 1000*c*, which begins in steps 1036 and 1038 by the plurality of third-party server computing devices providing simulation services to the applications in the corresponding virtual world layers, and in step 1040 by transmitting the simulated application content to the cloud server computers. In step 1042 the method 1000*c* proceeds by the at least one cloud server computer receiving the simulated application content from the virtual world layers sent by the plurality of third-party server computing devices. The method 1000*c* proceeds in step 1044 by pre-rendering the simulated application content from the virtual world layers and the base layer, and then in step 1046 by combining the pre-rendered application content from the virtual world layers and base layer into unitary virtual frames. Finally, the method 1000*c* continues in step 1048 by transmitting the unitary virtual frames to the one or more client devices for implementing final rendering, ending the process in terminator 1050.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A layer-partitioned virtual world system, comprising:

a server computing device comprising a processor and a memory storing a base layer including a persistent virtual world system comprising a plurality of virtual objects, the base layer supporting one or more virtual world layers providing one or more functionalities to the persistent virtual world system through one or more applications;

the server computing device configured for communication via a network with one or more software engines for providing one or more services to the one or more applications, wherein the one or more services provided by the one or more software engines comprise at least one of a simulation service or a rendering service used in creation and run-time execution of the one or more applications; and one or more client devices receiving and displaying one or more composited virtual frames corresponding to the base layer and the one or more functionalities of one or more of the plurality of virtual world layers, wherein the at least one server computing device is configured to:

receive, from the one or more client devices, a virtual world layer activation permission rule; and retrieve the one or more services associated with the one or more functionalities provided by the one or more software engines based on the virtual world layer activation permission rule.

2. The system of claim 1, wherein the plurality of virtual objects includes at least one of virtual objects that are virtual replicas of real world objects, or virtual objects that do not represent real world objects.

3. The system of claim 1, wherein the plurality of virtual objects includes at least one virtual object that is a virtual replica of a real world object that is capturing real-world data that is transmitted to the virtual replica, enriching and synchronizing the virtual replica with the real world object.

4. The system of claim 1, wherein the one or more virtual world layers include virtual world layer configuration data comprising context parameters, application metadata and the virtual world layer activation permission rule.

5. The system of claim 4, wherein the context parameters comprise one or more of: a location; a weather condition; a date; a time of day; a user entitlement; and an application theme.

6. The system of claim 4, wherein the virtual world layer activation permission rules comprise: permanent activation; context-based activation; manual activation upon matching one or more context parameters; manual activation at any moment; or security level clearance activation.

7. The system of claim 1, wherein the one or more virtual world layers includes sub-layers, each sub-layer comprising corresponding sub-layer configuration data.

8. The system of claim 4, wherein the virtual world layer configuration data is stored on the at least one server computing device, and wherein the at least one server computing device is further configured to:

receive a user state from the one or more client devices;

compare the user state with the virtual world layer activation permission rule to check whether the virtual world layer activation permission rule is met; and in response to determining that the virtual world layer activation permission rule is met, provide the one or more functionalities to the one or more client devices.

9. The system of claim 1, wherein the one or more software engines are configured to:

provide the simulation service to the one or more applications in the one or more virtual world layers to generate simulated application content; and transmit the simulated application content to the at least one server computing device;

wherein the at least one server computing device is configured to:

receive the simulated application content from the one or more virtual world layers sent by the one or more software engines;

wherein the at least one server computing device is configured to:

receive the simulated application content from the one or more virtual world layers sent by the one or more software engines;

implement final rendering on the simulated application content from the one or more virtual world layers to generate virtual world layer virtual frames;

composite the virtual world layer virtual frames and base layer virtual frames into unitary virtual frames; and transmit the composited unitary virtual frames to the one or more client devices.

10. The system of claim 1, wherein the one or more software engines are configured to:

provide simulation and rendering services to the one or more applications in the one or more virtual world layers; and transmit simulated and rendered application content to the at least one server computing device in virtual world layer virtual frames corresponding to each of the one or more virtual world layers; and wherein the at least one server computing device is configured to:

receive the simulated application content and rendered frames from the one or more virtual world layers sent by the one or more software engines;

render the base layer to create base layer virtual frames;

composite the virtual world layer virtual frames and the base layer virtual frames into unitary virtual frames; and transmit the composited unitary virtual frames to the one or more client devices.

11. The system of claim 1, wherein the one or more software engines are configured to:

provide simulation services to the one or more applications in the one or more virtual world layers to generate simulated application content; and transmit the simulated application content to the at least one server computing device; and wherein the at least one server computing device is configured to:

receive the simulated application content from the one or more virtual world layers sent by the one or more software engines;

pre-render the simulated application content from the one or more virtual world layers and the base layer to create pre-rendered virtual world layer virtual frames and base layer virtual frames;

composite the pre-rendered virtual world layer virtual frames and the base layer virtual frames into pre-rendered unitary virtual frames; and transmit the composited pre-rendered unitary virtual frames to the one or more client devices for implementing final rendering.

12. A method for providing a layer-partitioned virtual world system, the method comprising:

providing, by at least one server computing device, a base layer comprising a persistent virtual world system including a plurality of virtual objects;

receiving, by the at least one server computing device, one or more functionalities for the base layer from one or more applications in a one or more virtual world layers, wherein the one or more applications receive one or more services from a one or more software engines, wherein the one or more services provided by the one or more software engines comprise one or more simulation and rendering services used in creation and run-time execution of the one or more applications; and transmitting, by the at least one server computing device, virtual frames corresponding to the base layer and the one or more functionalities, receiving, by the at least one server computing device from one or more client devices, a virtual world layer activation permission rule; and retrieving the one or more services associated with the one or more functionalities provided by the one or more software engines based on the virtual world layer activation permission rule.

13. The method of claim 12, wherein the one or more virtual world layers comprise virtual world layer configuration data including context parameters, application metadata and the virtual world layer activation permission rule.

14. The method of claim 13, further comprising:

storing, by the at least one server computing device, the virtual world layer configuration data:

receiving, by the at least one server computing device from the one or more client devices, the virtual world layer activation permission rule;

receiving, by the at least one server computing device, a user state from the one or more client devices;

comparing, by the at least one server computing device, the user state with the virtual world layer activation permission rule to check whether any virtual world layer activation permission rule is met; and in response to determining that the virtual world layer activation permission rule is met, retrieving, by the at least one server computing device based on application metadata, the one or more application services associated with the one or more functionalities provided by the one or more software engines; and providing the one or more functionalities to the one or more client devices.

15. The method of claim 12, further comprising:

receiving, by the at least one server computing device, simulated application content from the one or more virtual world layers sent by the one or more software engines;

implementing, by the at least one server computing device, final rendering on the simulated application content from the one or more virtual world layers to generate virtual world layer virtual frames;

combining, by the at least one server computing device, the virtual world layer virtual frames and base layer virtual frames into unitary composited virtual frames; and transmitting, by the at least one server computing device, the unitary composited virtual frames to the one or more client devices.

16. The method of claim 12, further comprising:

receiving, by the at least one server computing device, simulated application content and virtual world layer virtual frames from the one or more virtual world layers sent by the one or more software engines;

rendering, by the at least one server computing device, the base layer to create base layer virtual frames;

combining, by the at least one server computing device, the base layer virtual frames and the virtual world layer virtual frames into unitary composited virtual frames; and transmitting, by the at least one server computing device, the unitary composited virtual frames to the one or more client devices.

17. The method of claim 12, further comprising:

receiving, by the at least one server computing device, the simulated application content from the one or more virtual world layers sent by the one or more software engines;

pre-rendering, by the at least one server computing device, the simulated application content from the one or more virtual world layers and the base layer to create pre-rendered virtual world layer virtual frames and base layer virtual frames;

combining, by the at least one server computing device, the pre-rendered virtual world layer virtual frames and the base layer virtual frames into pre-rendered unitary virtual frames; and transmitting, by the at least one server computing device, the pre-rendered unitary virtual frames to the one or more client devices for implementing final rendering.

18. The method of claim 12, further comprising overlapping two-or-three dimensional graphical representations from the one or more virtual world layers on top of the base layer.

19. The method of claim 12, further comprising defining the one or more virtual world layers graphically by transparent cutouts separating a first virtual world layer from a second virtual world layer;

upon activating the one or more virtual layers, highlighting one or more activated virtual layers graphically; and highlighting one or more virtual objects comprised within the one or more virtual world layers.

20. The method of claim 12, further comprising:

obtaining data points related to a field of view of a user or a user avatar in the persistent virtual world system; and generating a composite based on the data points.

* * * * *